US012328319B2

(12) United States Patent
Dutt et al.

(10) Patent No.: US 12,328,319 B2
(45) Date of Patent: Jun. 10, 2025

(54) IDENTITY ASSURANCE BASED AUTHORIZATION AND AUTHENTICATION SYSTEMS

(71) Applicant: Stripe, Inc., South San Francisco, CA (US)

(72) Inventors: Bala Dutt, Bengaluru (IN); Venkataramanan Subramanian, Hyderabad (IN); Manish Shah, Bangalore (IN); Anirudh Bhargava, Delhi (IN); Siddarth Chandrasekaran, Woodside, CA (US)

(73) Assignee: Stripe, Inc., South San Francisco, CA (US)

( * ) Notice: Subject to any disclaimer, the term of this patent is extended or adjusted under 35 U.S.C. 154(b) by 218 days.

(21) Appl. No.: 18/207,127

(22) Filed: Jun. 7, 2023

(65) Prior Publication Data
US 2024/0414165 A1    Dec. 12, 2024

(51) Int. Cl.
*H04L 9/40* (2022.01)
(52) U.S. Cl.
CPC .................. *H04L 63/102* (2013.01)

(58) Field of Classification Search
None
See application file for complete search history.

(56) References Cited

U.S. PATENT DOCUMENTS

2019/0289013 A1*  9/2019  Makmel ............. H04L 63/0876
2021/0131806 A1*  5/2021  Zaslavsky .......... H04L 63/0407

* cited by examiner

Primary Examiner — Cai Y Chen
(74) Attorney, Agent, or Firm — BAKERHOSTETLER (57) ABSTRACT

Aspects of the subject technology include a method comprising obtaining an enrollment confidence score and a validation confidence score, and determining an identity assurance score associated with the user account that indicates a level of confidence in an identity of the user. The identity assurance score is determined based at least in part on one or more of the enrollment confidence score or the validation confidence score. The method also comprises receiving, from a service provider, a request for the identity assurance score for the user account, the request corresponding to at least one of an authorization or an authentication of the user account at the service provider, and providing, responsive to the request, the identity assurance score of the user account to the service provider for at least one of the authorization or the authentication of the user account at the service provider.

20 Claims, 7 Drawing Sheets

IDENTITY ASSURANCE BASED AUTHORIZATION AND AUTHENTICATION SYSTEMS

TECHNICAL FIELD

The present description generally relates to authorization systems and, more particularly, to authorization systems based on identity assurance.

BACKGROUND

Identity proofing may be the process of verifying the identity of an individual by collecting and verifying personal information and credentials, such as name, address, date of birth, social security number, or other unique identifiers. This process is typically performed by an organization, such as a government agency, financial institution, or online service provider, to help verify that a user is who they claim to be before granting them access to information or services or issuing credentials.

BRIEF DESCRIPTION OF THE DRAWINGS

Certain features of the subject technology are set forth in the appended claims. However, for the purpose of explanation, several implementations of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In the subject system for identity assurance based authorization, metrics are provided to evaluate the confidence of one or more identity proofing processes, including the enrollment and/or validation of identity credentials, and the metrics are used to provide an identity assurance confidence for a given user account. The subject system provides improvements over existing systems by providing a dynamic, rather than static, framework for identity verification that more fully captures the changing nature of identity and the evolving threats to identity security. This framework allows systems to tailor their authentication processes to require different levels of identity assurance based on their risk profiles and potential consequences of identity fraud and misuse.

Figure 1:
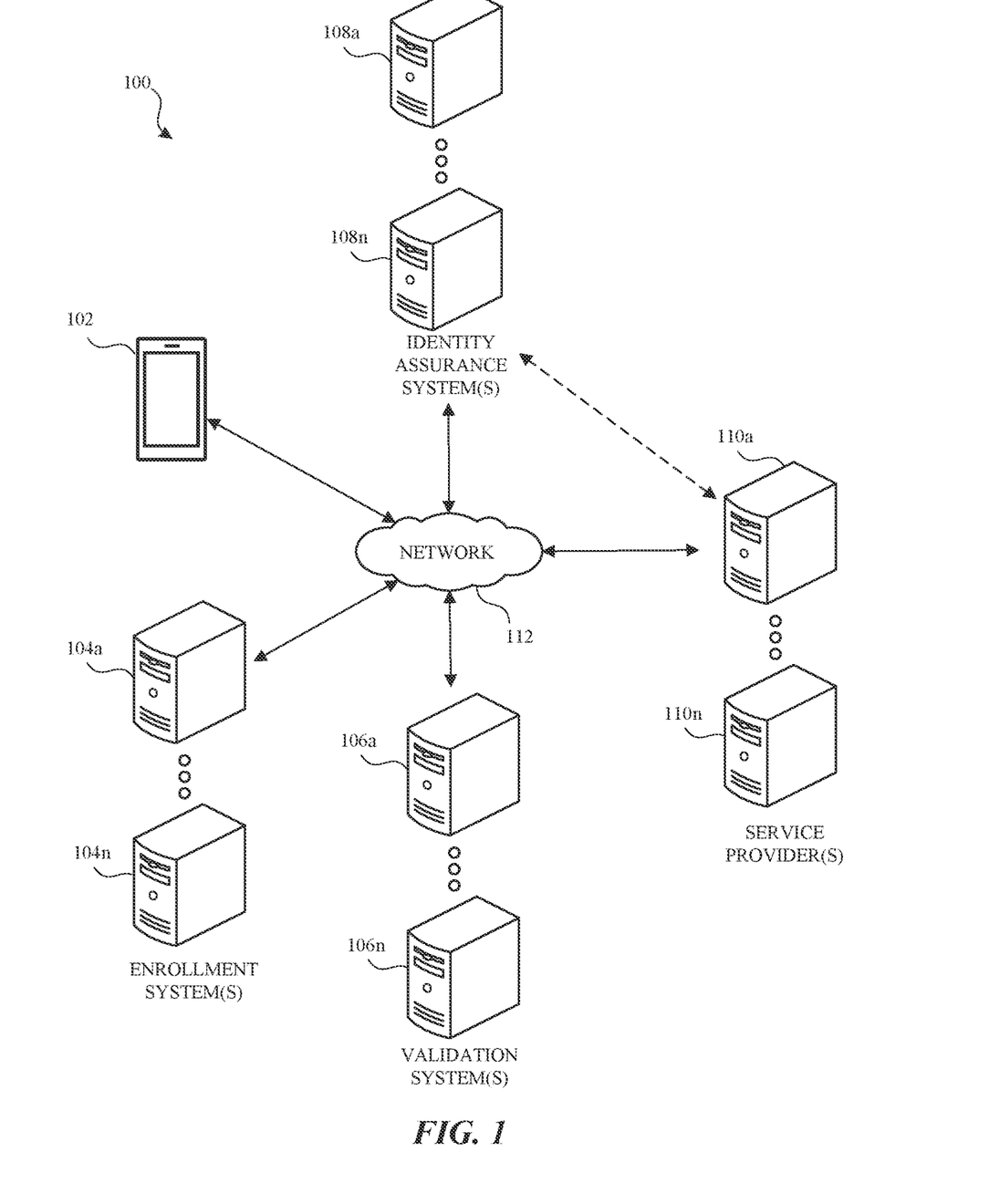
FIG. 1 illustrates an example network environment in which an identity assurance based authorization system may be implemented in accordance with one or more implementations.

FIG. 1 illustrates an example network environment in which an identity assurance based authorization system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 may include an electronic device 102, one or more enrollment systems 104 (e.g., enrollment systems 104a ... 104n), one or more validation systems 106 (e.g., validation systems 106a ... 106n), one or more identity assurance systems 108 (e.g., identity assurance systems 108a ... 108n), and one or more service providers 110 (e.g., service providers 110a ... 110n). The network 112 may communicatively (directly or indirectly) couple one or more of the electronic device 102, enrollment systems 104, validation systems 106, identity assurance systems 108, and/or service providers 110. In one or more implementations, the network 112 may be an interconnected network of devices that may include, or may be communicatively coupled to, the Internet.

For explanatory purposes, the network environment 100 is illustrated in FIG. 1 as including the electronic device 102, enrollment systems 104, validation systems 106, identity assurance systems 108, and service providers 110; however, the network environment 100 may include any number of electronic devices and/or any number of servers communicatively coupled to each other directly or via the network 112. In addition, the various systems of FIG. 1 may be, and/or may include all or part of, the electronic system discussed below with respect to FIG. 7.

The electronic device 102 may be, for example, a wearable device such as a watch, a band, and the like, a desktop computer, a portable computing device such as a laptop computer, a smartphone, a peripheral device (e.g., a digital camera, headphones), a tablet device, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone. The electronic device 102 may be, and/or may include all or part of, the electronic system discussed below with respect to FIG. 7 and may be associated with one or more user accounts, credentials, or any other identity information.

An enrollment system 104a may be, and/or may include, for example, one or more servers associated with an enrollment provider. The enrollment provider may be an organization or entity responsible for verifying the identity of the user and issuing credentials that can be used for authentication. The enrollment system 104*a* may receive and verify personally identifiable information, such as name, date of birth, address, social security number, or other forms of identification. Once the user's identity has been verified, the enrollment system 104*a* may generate a credential (e.g., a username and password, digital certificate) based on the personally identifiable information, which can then be used for authentication. The credential may be issued to the user by a process such as email, messaging, or in-person delivery. The enrollment provider may manage the lifecycle of the credential, including expiration, renewal, and revocation, which helps to keep the credential valid and secure.

For example, the U.S. Department of State may be an enrollment provider. A user may provide the Department of State photos, questionnaires, fingerprints, in-person interviews, and the like, to apply for a passport. Once the user's identity has been verified, the Department of State may create a passport based on the information provided by the user, which can be used for authenticating the user, for example, through international ports of entry. Similarly, other countries may have their own enrollment providers for issuing, e.g., passports. The enrollment process may differ and/or be more or less rigorous/secure across different enrollment providers.

A validation system 106*a* may be and/or may include, for example, one or more servers associated with a validation process. The validation process may be a system or process of verifying an identity using credentials. This may include, for example, verifying the authenticity of the credentials presented and/or verifying that the credentials presented belong to the user who presented them. The validation process may include biometric verification, digital signature verification, photo verification, and/or any other forms of credential validation. The validation process may also or instead include checking the format and structure of the credential, the expiration/revocation status of the credential, and/or verifying the validity (e.g., ownership and/or authenticity) of the credentials with the enrollment provider directly.

For example, the U.S. Customs and Border Protection (CBP) may validate credentials issued by U.S. Department of State. A user may provide an agent of the CBP a passport to demonstrate to the agent that the user is a registered U.S. citizen. The agent may check information in the passport (e.g., name and photo) and/or security features (e.g., color-shifting ink, RFID chip, and/or the like) to validate the passport. Once the agent confirms that the credential belongs to the user who presented it and/or confirms that the passport is valid (e.g., authentic and unexpired), the agent may allow the through an international port of entry. Similarly, other countries may have their own validation processes, which may differ and/or be more or less rigorous/secure.

An identity assurance system 108*a* may be and/or may include, for example, one or more servers configured to generate an identity assurance score, which represents the level of confidence in one or more aspects of an identity of a user. The identity assurance system 108*a* may obtain enrollment confidence scores and/or validation confidence scores related to a user, the credentials, and how the credentials are and/or were validated, and determine an identity assurance score as a function of the enrollment confidence and validation confidence scores. In some implementations, the identity assurance score may be for an account of the user, such as with a service provider 110*a* and/or with an identity assurance system 108*a*, in which case the enrollment confidence scores and/or validation confidence scores may correspond to the credentials that the user provided to the service provider 110*a* when registering for the account. Enrollment confidence scores may be derived from information corresponding to one or more enrollment systems 104, and validation confidence scores may be derived from information corresponding to one or more validation systems 106. In some implementations, the identity assurance score may also be a function of time. This identity assurance score may provide a dynamic metric about the identity assurance system's 108*a* confidence about the identity of the user corresponding to a registered user account at a given point in time.

A service provider 110*a* may be and/or may include, for example, one or more servers that host or facilitate a service that may be used by one or more users. The service provider 110*a* may utilize the identity assurance score determined by the identity assurance system 108*a* to determine an appropriate level of access to grant the user. For example, if the user has an identity assurance score at or above a threshold level, the service provider 110*a* may allow the user access to more sensitive resources than if the identity assurance score is below the threshold level. In some implementations, the service provider 110*a* may include all or part of the identity assurance system 108*a*. In some implementations, the enrollment system 104*a*, the validation system 106*a*, and/or the identity assurance system 108*a* may be part of the same system as the service provider 110*a*.

Figure 2:
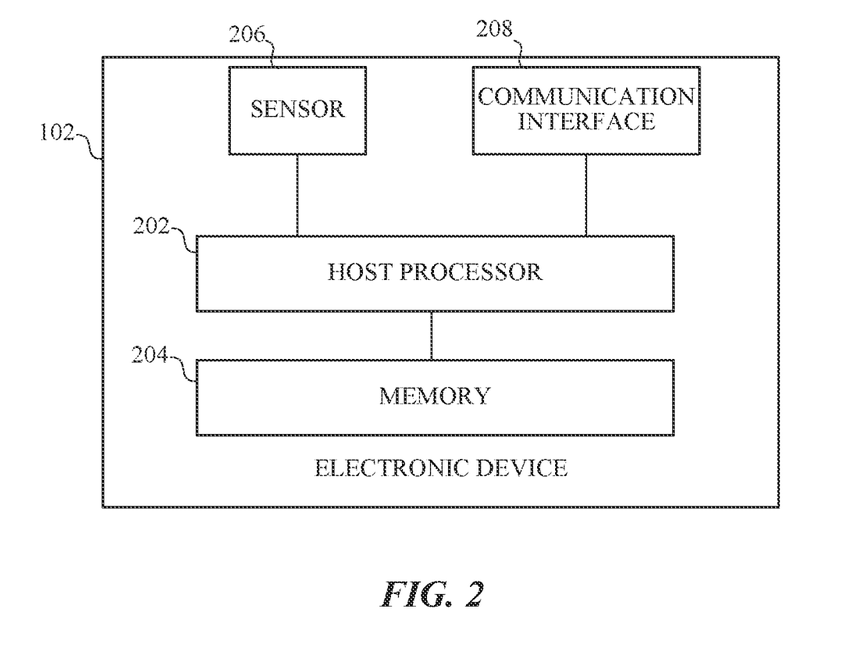
FIG. 2 depicts an example electronic device that may be used in an identity assurance based authorization system in accordance with one or more implementations.

FIG. 2 depicts an example electronic device that may be used in an identity assurance based authorization system, in accordance with one or more implementations. For explanatory purposes, FIG. 2 is primarily described herein with reference to the electronic device 102 of FIG. 1. However, this is merely illustrative, and features of the electronic device of FIG. 2 may be implemented in any other electronic device for implementing the subject technology. Not all of the depicted components may be used in all implementations, however, and one or more implementations may include additional or different components than those shown in FIG. 2. Variations in the arrangement and type of the components may be made without departing from the spirit or scope of the claims as set forth herein. Additional components, different components, or fewer components may be provided.

The electronic device 102 may include one or more of a host processor 202, a memory 204, a sensor 206, and/or a communication interface 208. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. The host processor 202 may further implement an operating system or may otherwise execute code to manage operations of the electronic device 102.

The memory 204 may include suitable logic, circuitry, and/or code that enable storage of various types of information such as received data, generated data, code, and/or configuration information. The memory 204 may include volatile memory (e.g., random access memory (RAM)) and/or non-volatile memory (e.g., read-only memory (ROM), flash, and/or magnetic storage). In one or more implementations, the memory 204 may store user location data, track data (e.g., lane information), exercise data (e.g., biometrics), account data, and any other data generated in the course of performing the processes described herein.

The sensor(s) 206 may include one or more microphones and/or cameras. The microphones may obtain audio signals to perform identity enrollment and/or credential validation. For example, the microphones may obtain audio of the user reading a passphrase or authentication code. The cameras may be used to capture images corresponding to identity data and/or credentials. For example, the cameras may capture images of a user (e.g., a selfie) for comparison against a database of images of users, may capture images of a user's identity credentials, such as driver's license, passport, etc., and/or may be used for a "liveness" determination.

The communication interface 208 may include suitable logic, circuitry, and/or code that enables wired or wireless communication, such as between the electronic device 102 and the service providers 110. The communication interface 208 may include, for example, one or more of a Bluetooth communication interface, an NFC interface, a Zigbee communication interface, a WLAN communication interface, a USB communication interface, a cellular interface, or generally any communication interface.

In one or more implementations, one or more of the host processor 202, the memory 204, the sensors 206, the communication interface 208, and/or one or more portions thereof may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
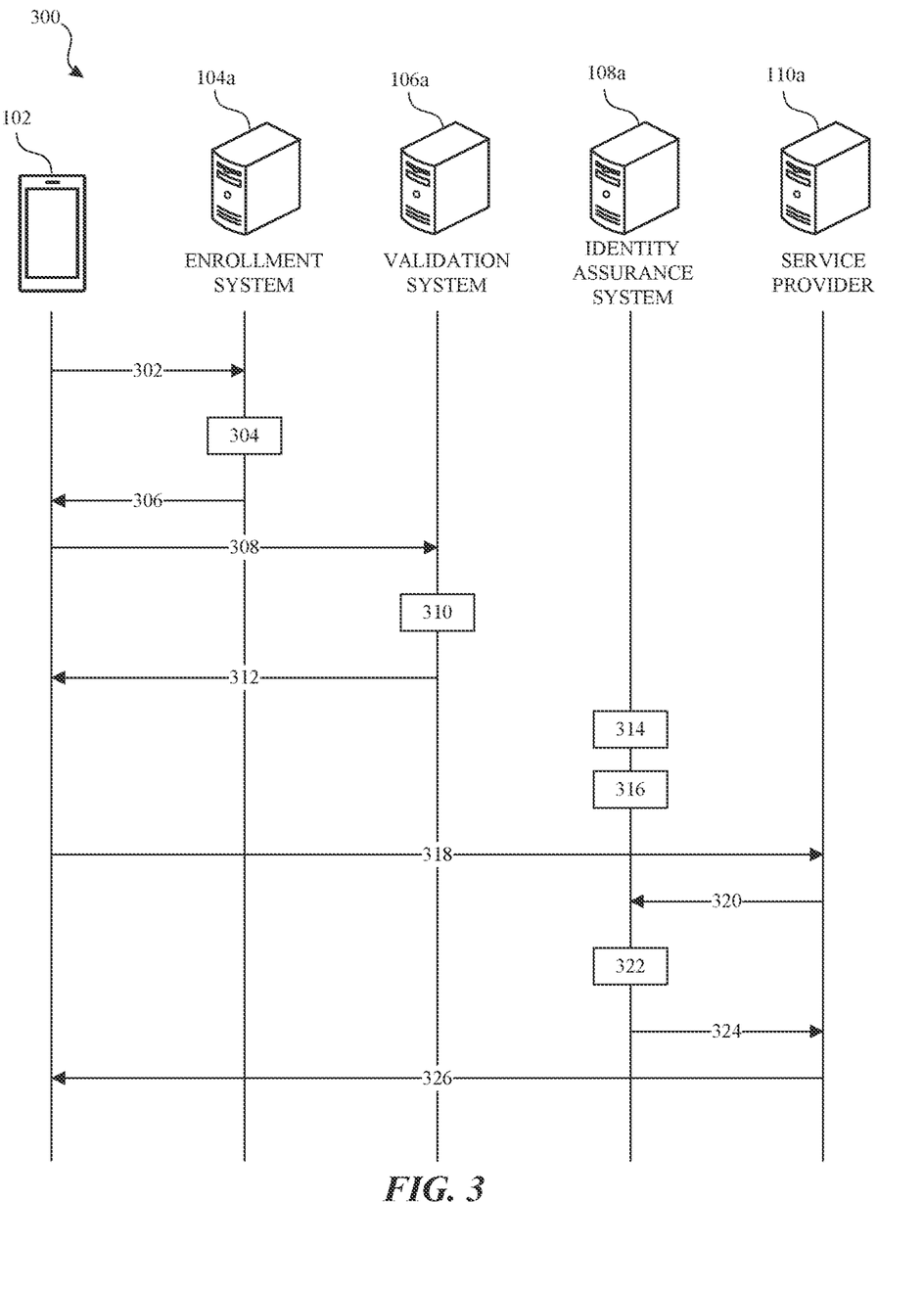
FIG. 3 depicts a timing diagram for an identity assurance based authorization system in accordance with one or more implementations.

FIG. 3 depicts a timing diagram 300 for an identity assurance based authorization system in accordance with one or more implementations. For explanatory purposes, the timing diagram 300 is primarily described herein with reference to the electronic device 102, an enrollment system 104a, a validation system 106a, an identity assurance system 108a, and a service provider 110a of FIG. 1. However, the timing diagram 300 is not limited to the electronic device 102, the enrollment system 104a, the validation system 106a, the identity assurance system 108a, or service provider 110a, and one or more time periods of the timing diagram 300 may be performed by one or more other by other suitable devices. Further, for explanatory purposes, the time periods of the timing diagram 300 are described herein as occurring sequentially or linearly. However, multiple time periods of the timing diagram 300 may occur in parallel. In addition, the time periods of the timing diagram 300 need not be performed in the order shown and/or one or more time periods of the timing diagram 300 need not be performed and/or can be replaced by other operations.

At time period 302, the user (e.g., in person or electronically via the electronic device 102) may initiate an enrollment for a credential with the enrollment system 104a. The enrollment process may begin with the electronic device 102 sending a request to the enrollment system 104a.

At time period 304, the enrollment system 104a may work with the electronic device 102 to generate a credential. The user may start by registering with the enrollment system 104a, which involves providing personal information such as a name, email address, and other identifying information. The enrollment system 104a may then verify the user's identity through various methods, such as verifying their social security number, driver's license, or other government-issued identification documents. Once the user's identity has been verified, the enrollment system 104a may then create a credential or token that can be used for validation, such as a username and password, a digital certificate, or a physical credential (e.g., passport or driver's license).

For example, the user may receive a student ID from a university (e.g., via an enrollment system). In this case, the user may register with the university by providing an application including personal information. Once the university approves the user to be a student based on the application, the university may request that the user present a government-issued ID in person to verify the user's identity. A university employee may issue a student ID to the user if the government-issued ID matches the individual who presented it.

At time period 306, the enrollment system 104a may then issue the credential to the user. The electronic device 102 may repeat time period 302, time period 304, and time period 306 for multiple forms of credentials over time with the same or different enrollment systems 104. For example, the user may have a passport with the US Department of State, a login/password and a debit card with a credit union, and a student ID from a local university.

At time period 308, the user, via the electronic device 102, may initiate a validation for the credential with the validation system 106a. The validation process may begin with the electronic device 102 sending a request, including the credential, to the validation system 106a. For example, the user may register for an account with the service provider 110a and, as part of that registration, provide the service provider 110a the credential, which the service provider 110a validates via the validation system 106a.

At time period 310, the validation system 106a may validate the authenticity of the credential or token provided at time period 308. This can be done through various methods, such as digital signatures, biometrics, in-person meetings, video calls, photo comparisons, credential authentication, and/or the like. For example, when a user attempts to access a secure facility that requires a security badge for entry, the user may present a security badge to the security guard at the entrance. The security guard may verify the authenticity of the badge by checking its design, security features, confirm that an image of the user on the badge looks the same as the user, or other characteristics. The security guard may also require the individual to provide additional forms of identification or undergo additional security screening before granting access to the building.

At time period 312, the validation system 106a may then send a validation status to the user. For example, the validation system 106a may send an indication that the credential in question is valid or invalid. The validation system 106a may provide reasons for why the credential is valid or invalid. For example, the credential may be fraudulent or expired.

The electronic device 102 may repeat time period 308, time period 310, and time period 312 for multiple credentials over time with the same or different validation systems 106a. For example, the user may validate a passport with a customs agent at a port of entry by in-person meeting, with a bank by photograph, and/or with a state election commission by providing the passport number.

At time period 314, the identity assurance system 108a may obtain enrollment confidence scores of one or more enrollment systems 104, including the enrollment system 104a. An enrollment confidence score indicates a level of confidence in an enrollment system 104a that issues credentials and may be determined by the identity assurance system 108a or any other system. The enrollment confidence score may be determined based on several factors, including the level of identity proofing, the strength of the credentials, and the security of the enrollment process itself.

The level of identity proofing used by an enrollment provider may involve verifying the user's identity through various methods, such as checking government-issued identification documents, conducting background checks, or using biometric verification. The more rigorous the identity proofing process, the higher the level of confidence that the credential issued by the enrollment provider is valid and trustworthy. Additionally, the strength of the credentials may involve the use of multi-factor authentication, such as requiring a combination of something the user knows (e.g., a password) or something they have (e.g., a token or biometric identifier). The more factors used in the authentication process, the higher the level of confidence that the credential is valid and trustworthy. Furthermore, the security of the enrollment process itself may include ensuring that the enrollment process is conducted in a secure and controlled environment, using secure channels for transmitting personal and sensitive information, and protecting the confidentiality, integrity, and availability of the user's personal data.

The identity assurance system 108a may also or instead obtain validation confidence scores of one or more validation systems, including the validation system 106a. A validation confidence score indicates a level of confidence in a validation system 106a that validates credentials and may be determined by the identity assurance system 108a or any other system. The validation confidence score may be determined based on several factors, including the reliability of the credential, the level of assurance provided by the enrollment provider, and the security of the validation process itself. In one or more implementations, the validation score may also be based on the enrollment confidence score corresponding to the enrollment provider that issued the credential being verified.

The reliability of the credential involves verifying that the credential is valid and has not been tampered with or compromised. This may be done through various methods, such as checking digital signatures or cryptographic keys, or using biometric verification to verify that the person presenting the credential is the same as the one who originally enrolled. Additionally, enrollment providers may offer different levels of assurance based on the level of identity proofing and authentication used during the enrollment process. The higher the level of assurance provided by the identity provider, the more confidence the verifier can have in the validity and trustworthiness of the credential. Furthermore, the security of the validation process helps verify that the validation process is conducted in a secure and controlled environment, using secure channels for transmitting sensitive information, and protecting the confidentiality, integrity, and availability of the user's personal data.

At time period 316, the identity assurance system 108a may calculate an identity assurance score of the user. The identity assurance score is a point-in-time value that represents the confidence in the user's identity based on credentials associated with the user account of the service provider 110a. The user account may have one or more credentials and each credential may be validated by one or more validation methods. Accordingly, the identity assurance score may be derived from the enrollment confidence scores and/or the validation confidence scores of the credentials associated with the user account. The identity assurance score may be on a scale from 0 to 100, where 0 indicates no assurance and 100 indicates a near guarantee of the user's identity, or 0 to 1, or any other scale. In one or more implementations, the identity assurance score decays with time and may be automatically updated when new data is available (e.g., a new enrollment, new validation, or credential expiration). In some implementations, the identity assurance score may be determined by the following:

$$\text{Identity Assurance Score} = \frac{1}{n}\sqrt{\sum_{i=1}^{n} T_i^2},$$

$$T_i = k * EC_i * VC_i * e^{-k_d*(T_{now}-T_{validation})}$$

if $$T_{issue} \leq T_{now} \leq T_{expiry},$$

and $$T_i = 0$$

for all other $T_{now}$, where k is a normalizing coefficient (e.g., a constant used to scale $T_i$ to a common reference point), $k_d$ is a decay factor (e.g., for decreasing the identity assurance score it ages), Tis time (issue and expiry times are for credentials), EC is an enrollment confidence score, and VC is a validation confidence score.

At time period 318, the user may log into an account that the user previously registered with the service provider 110a. The electronic device 102 may provide credentials that the service provider 110a issued to the user when the user registered for the user account at the service provider 110a. Such credentials may include a username and password, a digital certificate, or other forms of secure authentication. The electronic device 102 may also send an authorization request to the service provider 110a for accessing a service of the service provider 110a. Services may include activities, transactions, data access, and any other action that the user may perform via the service provider 110a. For example, once the user is logged into a bank account, the user may initiate the transfer of funds.

At time period 320, once the credentials are validated and the user is logged in, the service provider 110a may check the user's access rights to the service to determine whether to grant or reject the user's request. Determining whether the user is authorized may be based on the level of confidence in the user's identity. Accordingly, the service provider 110a may send a request to the identity assurance system 108a for an identity assurance score associated with the account of the user to determine whether the user's access rights are sufficient to grant access to the requested service.

At time period 322, the identity assurance system 108a may access the user's identity assurance score. The identity assurance system 108a may generate the identity assurance score upon request, retrieve the identity assurance score from memory, or otherwise obtain the identity assurance score. The identity assurance system 108a may also update the identity assurance system 108a to increase or decrease the score as appropriate. For example, the identity assurance score may be increased due to the successful login of the user to the service provider 110a and may be decreased due to the age of the user's other credentials. In one or more implementations, the identity assurance system 108a may also or instead access the user's identity assurance score when the user first registers for an account with the service provider 110a.

At time period 324, the identity assurance system 108a may provide to the service provider 110a the identity assurance score associated with the account of the user. The service provider 110a may access a threshold level of confidence associated with accessing the service. The service provider 110a may have multiple thresholds for different services that it offers, and the selection of an appropriate threshold may be based on the level of risk associated with the activity and the potential consequences of identity fraud or misuse. Higher thresholds may generally provide greater confidence in the authenticity of an identity but may also require more friction (e.g., time and resources) to implement and maintain. The thresholds may change over time. For example, if activity associated with the user's account is flagged as potentially fraudulent, then one or more thresholds may increase, requiring a higher level of identity assurance in order to be authorized.

The service provider 110a may compare the identity assurance score to the threshold associated with the service for which the user is requesting authorization. The request may be granted if the identity assurance score satisfies the thresholds (e.g., is at or above the threshold); otherwise, the request may be rejected.

At time period 326, if the user's request is granted, the service provider 110a may indicate to the user that the electronic device 102 may access the requested service.

Figure 4:
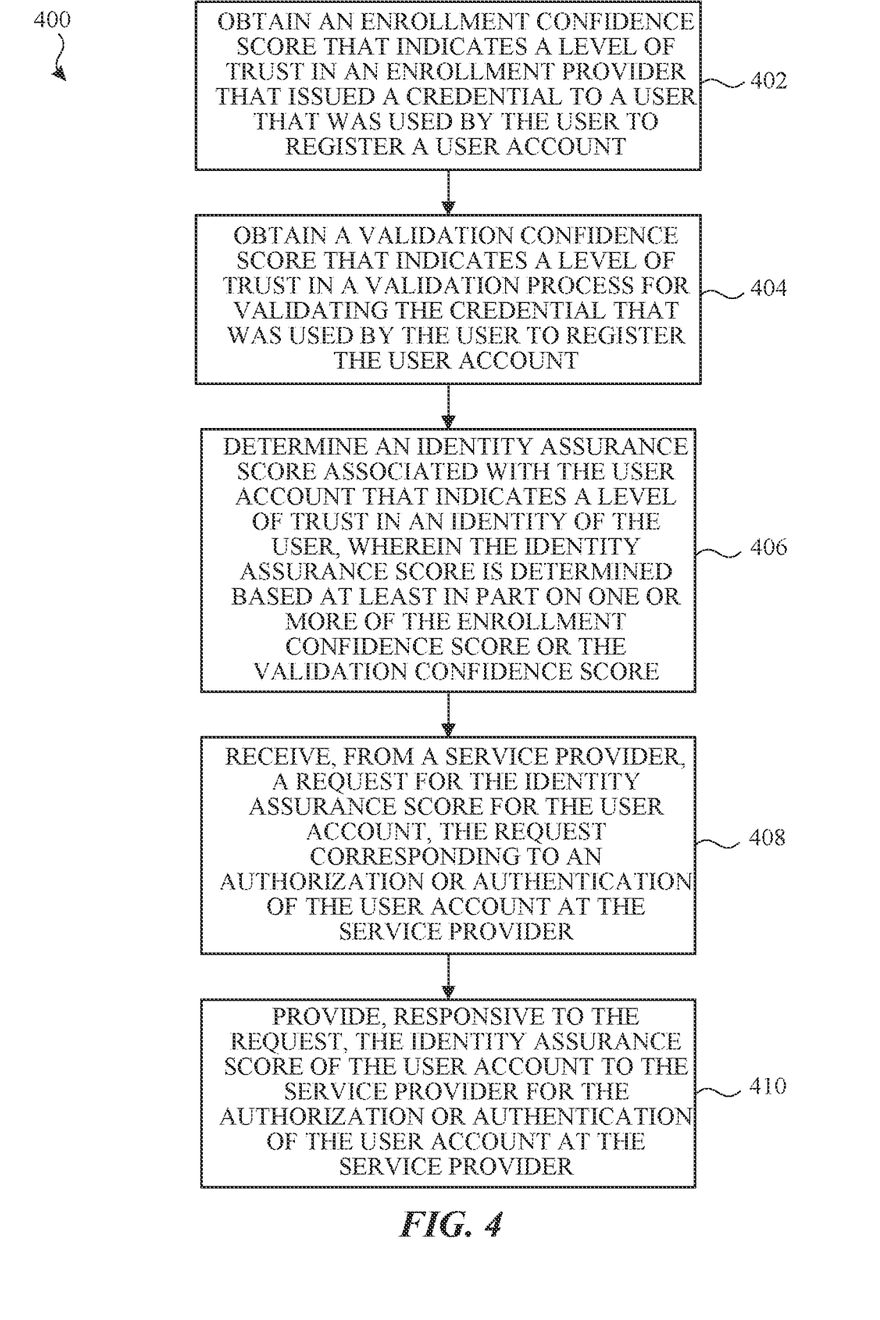
FIG. 4 depicts a flow diagram of an example process for generating an identity assurance score, in accordance with one or more implementations.

FIG. 4 depicts a flow diagram of an example process 400 for generating an identity assurance score, in accordance with one or more implementations. For explanatory purposes, the process 400 is primarily described herein with reference to the identity assurance system 108a of FIG. 1. However, the process 400 is not limited to the identity assurance system 108a, and one or more blocks of the process 400 may be performed by one or more other by other suitable devices. Further, for explanatory purposes, the blocks of the process 400 are described herein as occurring sequentially or linearly. However, multiple blocks of the process 400 may occur in parallel. In addition, the blocks of the process 400 need not be performed in the order shown and/or one or more blocks of the process 400 need not be performed and/or can be replaced by other operations.

At block 402, the identity assurance system 108a may access, receive, generate, or otherwise obtain one or more enrollment confidence scores. An enrollment confidence score indicates a level of confidence in an enrollment provider (e.g., an enrollment system 104a) that issued a credential to a user. The user may have used the credential to register a user account with the service provider 110a.

The enrollment confidence score of an enrollment system 104a may be generated as a function of a type of credential issued by the enrollment provider, an enrollment history of the enrollment provider, a complexity of an enrollment process of the enrollment provider, a number of fraudulent credentials corresponding to the enrollment provider, and/or any other characteristics of the enrollment provider related to the credential.

A type of credential issued by the enrollment provider may include a physical credential, such as an ID card, or a digital token, such as a cryptographically signed digital credential. An enrollment history of the enrollment provider may include the number of enrollees, the amount of time that the enrollment provider has been issuing credentials, the status of issued credentials (e.g., whether an issued credential has been forged), and/or any other information related to the reputation of the enrollment provider. A complexity of the enrollment process of the enrollment provider may include the time it takes to be issued a credential, the user's involvement in the enrollment process, the type and/or amount of identity proofing performed (e.g., in-person meeting, video liveness test, selfie submission, etc.), and/or any other information related to the enrollment process.

At block 404, the identity assurance system 108a may access, receive, generate, or otherwise obtain one or more validation confidence scores. A validation confidence score indicates a level of confidence in a validation process (e.g., performed by a validation system 106a) for validating the credential that was used by the user to register the user account with the service provider 110a.

The validation confidence score of a validation system 106a may be generated as a function of variables including one or more enrollment confidence scores that correspond to the credential being validated, the credential issued by the enrollment provider (e.g., the type of credential, such as physical or digital), a validation type (e.g., in-person or over video) that indicates a manner in which the credential is validated, and/or any other characteristics of the validation process related to the credential. Different types of credentials may be weighted differently in determining a validation confidence score. For example, different types of validation may be weighted differently in determining a validation confidence score. For example, an in-person validation may be weighted more than a remote validation (e.g., a video call or a selfie), and a video call may be weighted more than a selfie.

At block 406, the identity assurance system 108a may determine an identity assurance score associated with the user account. The identity assurance score indicates a level of confidence in an identity of the user and is determined based at least in part on one or more enrollment confidence scores and/or one or more validation confidence scores.

The enrollment confidence scores and validation confidence scores that are used to determine the identity assurance score may be those that correspond to credentials registered with the user's account. When the user registers for an account with a service provider 110a, the user may provide one or more credentials to the service provider 110a to establish the user's identity. The identity assurance system 108a may obtain information about the credentials and their validation to determine and/or obtain the corresponding enrollment confidence scores and validation confidence scores for determining the identity assurance score.

The identity assurance score may be cached for subsequent reference. The identity assurance score may be cached locally and/or remotely and may be cached with other identity assurance scores (e.g., of other users).

The identity assurance score may be recalculated periodically, such as after a predetermined period of time and/or in response to a predetermined event (e.g., validation of a credential of the user or associating a new credential to the account of the user). Recalculating may include decaying the score as time passes. The identity assurance system 108a may determine an age of the most recent identity assurance score and decrease the identity assurance score as a function of its age when the age exceeds an age threshold. For example, after one month since the most recent validating, the identity assurance system 108a may begin to reduce the identity assurance score.

At block 408, the service provider 110a may receive an authorization request for accessing a service by the user account. The authorization request may be generated in response to the user attempting to utilize a service at the service provider 110a. The identity assurance system 108a may receive a request for, and provide to the service provider 110a, the identity assurance score associated with the account of the user. At block 410, the service provider 110a may receive the identity assurance score provided by the identity assurance system 108a and may determine whether the identity assurance score satisfies a threshold associated with accessing the service. The service provider 110a may store one or more thresholds that correspond to one or more services and may compare the identity assurance score with the threshold that corresponds to the service for which the user is requesting authorization.

The authorization request may be granted if the service provider 110a determines that the identity assurance score satisfies the threshold. For example, the authorization request may be granted if the identity assurance score meets or exceeds the threshold. Otherwise, the authorization request may be denied. In some implementations, before the authorization request, the service provider 110a may receive an authentication request for the service provider 110a to authenticate the user account via the identity assurance score.

Figure 5:
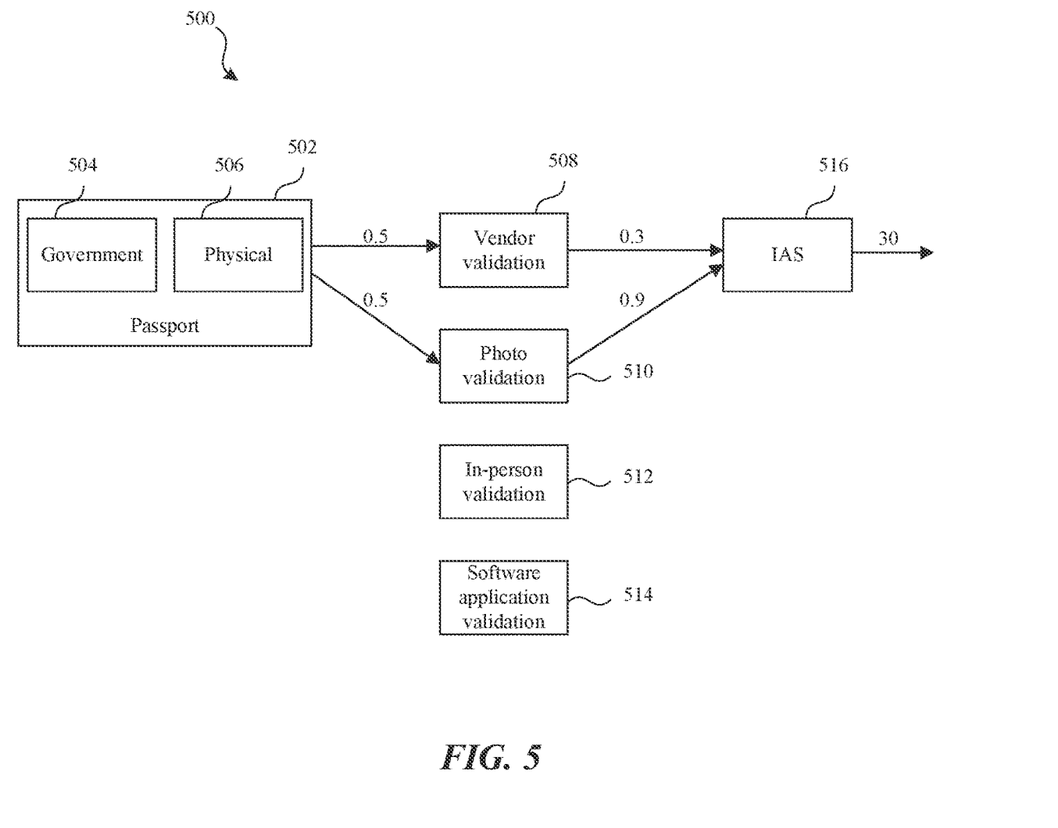
FIG. 5 depicts a diagram of an example identity assurance score determination, in accordance with one or more implementations.

FIG. 5 depicts a diagram 500 of an example identity assurance score 516, in accordance with one or more implementations. A user may provide an image of the passport 502 to the service provider 110a and/or the identity assurance system 108a. The credential type 506 of the passport 502 may be a physical credential and the enrollment provider 504 may be the government of a country. Due to the rigor of the enrollment process (e.g., identity proofing, enrollment history, etc.) of the enrollment provider 504, the enrollment confidence level for the passport is 0.5. Validation of the passport 502 through an external vendor 508 provides a validation confidence of 0.3, whereas validation through a selfie in photo validation 510 has a higher confidence of 0.9. These two together produce an identity assurance score 516 of 30. The service provider 110a may have a threshold score of at least 40 for a particular service (e.g., a program, data, capability, etc.). In such a situation, the threshold may not be satisfied and the user may be denied access to the service; however, the score may be sufficient to access other services for which the threshold is lower. The user may be asked to provide additional credentials and/or may be asked to further validate previously presented credentials via other validation methods (e.g., in-person validation 512 and software application validation 514).

Figure 6:
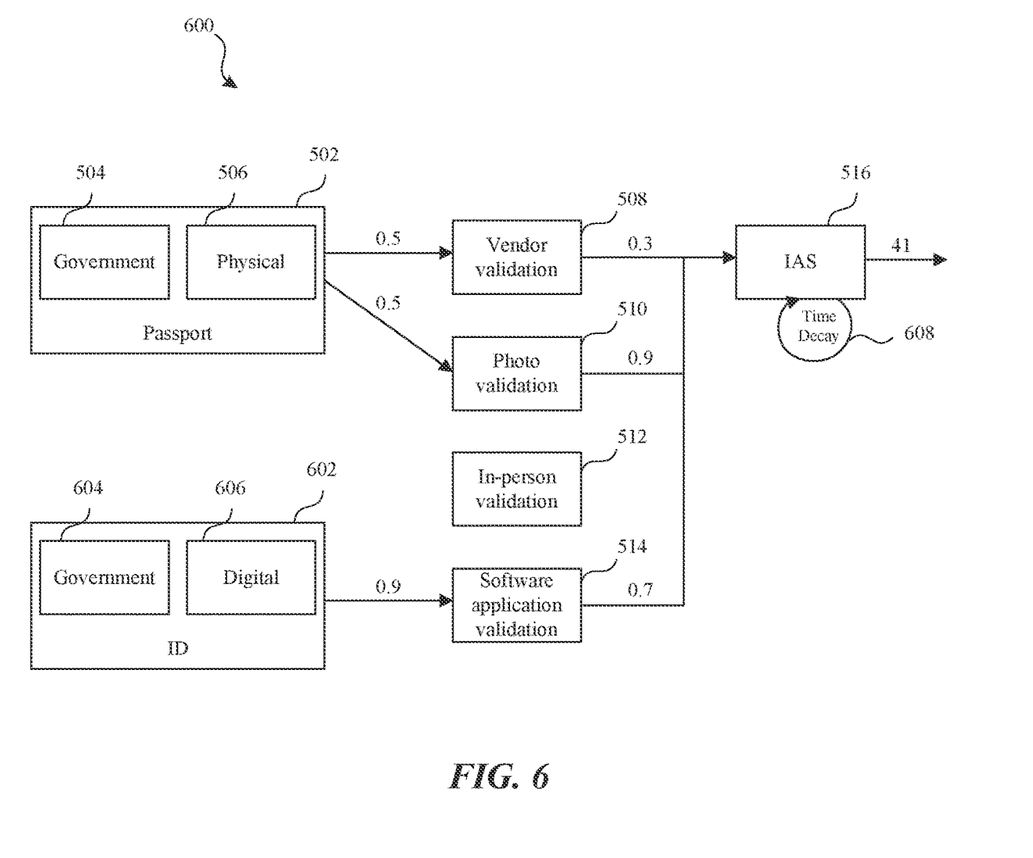
FIG. 6 depicts a diagram of an example identity assurance score determination incorporating time decay, in accordance with one or more implementations.

FIG. 6 depicts a diagram 600 of an example identity assurance score 516 with time decay, in accordance with one or more implementations. The user may provide an electronic state ID 602 (e.g., digital passport) in addition to the passport 502 to increase the identity assurance score 516. The credential type 606 of the electronic state ID 602 may be a digital token and the enrollment provider 604 may be the government of the country that issued the electronic state ID 602. With an enrollment confidence of 0.9 and validation confidence of 0.7, the identity assurance score is now 41. As time passes since the latest validation (e.g., software application validation 514 of the electronic state ID 602), the identity assurance score 516 may decay by a predetermined time decay factor 608. For example, the identity assurance score 516 may decay weekly from the latest validation. In some implementations, enrollment confidence levels and/or validation confidence levels may also decay, thereby causing the identity assurance score 516 to decay. In some implementations, the time decay factor 608 may correspond to particular events. For example, the expiration of a credential may cause the identity assurance score 516 to decay by a fixed amount. The severity of the decay may also be based on the event. For example, the identity assurance score 516 may significantly decay when a credential expires but may slightly decay when the credential has gone unused for a short period of time.

Figure 7:
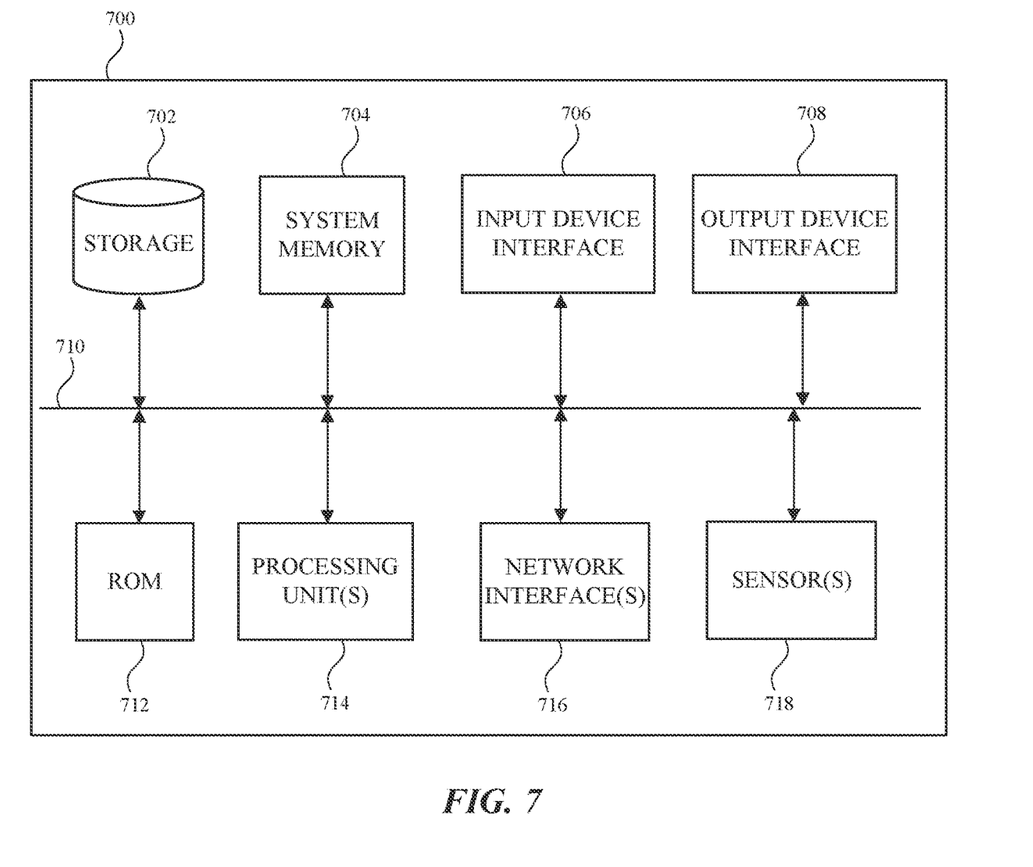
FIG. 7 depicts an example electronic system with which aspects of the present disclosure may be implemented, in accordance with one or more implementations.

FIG. 7 depicts an example electronic system with which aspects of the present disclosure may be implemented, in accordance with one or more implementations. The electronic system 700 can be, and/or can be a part of, any electronic device for generating the features and processes described in reference to FIGS. 1-6, including but not limited to a laptop computer, tablet computer, smartphone, and wearable device (e.g., smartwatch, fitness band). The electronic system 700 may include various types of computer-readable media and interfaces for various other types of computer-readable media. The electronic system 700 includes one or more processing unit(s) 714, a persistent storage device 702, a system memory 704 (and/or buffer), an input device interface 706, an output device interface 708, a bus 710, a ROM 712, one or more processing unit(s) 714, one or more network interface(s) 716, one or more sensor(s) 718, and/or subsets and variations thereof.

The bus 710 collectively represents all system, peripheral, and chipset buses that communicatively connect the numerous internal devices of the electronic system 700. In one or more implementations, the bus 710 communicatively connects the one or more processing unit(s) 714 with the ROM 712, the system memory 704, and the persistent storage device 702. From these various memory units, the one or more processing unit(s) 714 retrieves instructions to execute and data to process in order to execute the processes of the subject disclosure. The one or more processing unit(s) 714 can be a single processor or a multi-core processor in different implementations.

The ROM 712 stores static data and instructions that are needed by the one or more processing unit(s) 714 and other modules of the electronic system 700. The persistent storage device 702, on the other hand, may be a read-and-write memory device. The persistent storage device 702 may be a non-volatile memory unit that stores instructions and data even when the electronic system 700 is off. In one or more implementations, a mass-storage device (such as a magnetic or optical disk and its corresponding disk drive) may be used as the persistent storage device 702.

In one or more implementations, a removable storage device (such as a floppy disk, flash drive, and its corresponding disk drive) may be used as the persistent storage device 702. Like the persistent storage device 702, the system memory 704 may be a read-and-write memory device. However, unlike the persistent storage device 702, the system memory 704 may be a volatile read-and-write memory, such as RAM. The system memory 704 may store any of the instructions and data that one or more processing unit(s) 714 may need at runtime. In one or more implementations, the processes of the subject disclosure are stored in the system memory 704, the persistent storage device 702, and/or the ROM 712. From these various memory units, the one or more processing unit(s) 714 retrieves instructions to execute and data to process in order to execute the processes of one or more implementations.

The bus 710 also connects to the input device interfaces 706 and output device interfaces 708. The input device interface 706 enables a user to communicate information and select commands to the electronic system 700. Input devices that may be used with the input device interface 706 may include, for example, alphanumeric keyboards, touch screens, and pointing devices. The output device interface 708 may enable the electronic system 700 to communicate information to users. For example, the output device interface 708 may provide the display of images generated by electronic system 700. Output devices that may be used with the output device interface 708 may include, for example, printers and display devices, such as a liquid crystal display (LCD), a light emitting diode (LED) display, an organic light emitting diode (OLED) display, a flexible display, a flat panel display, a solid-state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 710 also couples the electronic system 700 to one or more networks and/or to one or more network nodes through the one or more network interface(s) 716. In this manner, the electronic system 700 can be a part of a network of computers (such as a local area network, a wide area network, an Intranet, or a network of networks, such as the Internet). Any or all components of the electronic system 700 can be used in conjunction with the subject disclosure.

Finally, as shown in FIG. 7, the bus 710 also connects to sensor(s) 718. The sensor(s) 718 may include one or more components for capturing data, such as audio and/or image data. The captured data may be used for enrolling in a credential, validating a credential, accessing a service, and/or any other process for establishing the identity of the user.

Implementations within the scope of the present disclosure can be partially or entirely realized using a tangible computer-readable storage medium (or multiple tangible computer-readable storage media of one or more types) encoding one or more computer-readable instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessors or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refers to only A, only B, or only C; any combination of A, B, and C; and/or at least one of each of A, B, and C.

The predicate words "configured to," "operable to," and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, one or more implementations, one or more implementations, an embodiment, the embodiment, another embodiment, one or more implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any implementation described herein as "exemplary" or as an "example" is not necessarily to be construed as preferred or advantageous over other implementations. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   obtaining an enrollment confidence score that indicates a level of confidence in an enrollment provider that issued a credential to a user that was used by the user to register a user account;
   obtaining a validation confidence score that indicates a level of confidence in a validation process for validating the credential that was used by the user to register the user account;
   determining an identity assurance score associated with the user account that indicates a level of confidence in an identity of the user, wherein the identity assurance score is determined based at least in part on one or more of the enrollment confidence score or the validation confidence score;
   receiving, from a service provider, a request for the identity assurance score for the user account, the request corresponding to at least one of an authorization or an authentication of the user account at the service provider; and
   providing, responsive to the request, the identity assurance score of the user account to the service provider for at least one of the authorization or the authentication of the user account at the service provider.

2. The method of claim 1, wherein obtaining the enrollment confidence score comprises generating the enrollment confidence score as a function of one or more of a type of credential issued by the enrollment provider, an enrollment history of the enrollment provider, or a complexity of an enrollment process of the enrollment provider.

3. The method of claim 1, wherein the validation confidence score is based on one or more of the enrollment confidence score, the credential issued by the enrollment provider, or a validation type that indicates a manner in which the credential is validated.

4. The method of claim 3, wherein the validation type comprises at least one of an in-person validation, video call validation, photo validation, or credential authentication.

5. The method of claim 1, further comprising:
   determining an age of the identity assurance score; and
   decreasing the identity assurance score as a function of the age when the age exceeds an age threshold.

6. The method of claim 1, further comprising:
   determining an age of the credential; and
   decreasing the validation confidence score as a function of the age when the age exceeds an age threshold.

7. The method of claim 1, wherein the user account is authorized when the identity assurance score satisfies a threshold.

8. The method of claim 7, wherein the identity assurance score satisfies the threshold when the identity assurance score exceeds the threshold.

9. A system comprising:
   a memory; and
   a processor configured to:
   obtain an enrollment confidence score that indicates a level of confidence in an enrollment provider that issued a credential to a user that was used by the user to register a user account;
   obtain a validation confidence score that indicates a level of confidence in a validation process for validating the credential that was used by the user to register the user account;
   determine an identity assurance score associated with the user account that indicates a level of confidence in an identity of the user, wherein the identity assurance score is determined based at least in part on one or more of the enrollment confidence score or the validation confidence score;
   receive, from a service provider, a request for the identity assurance score for the user account, the request corresponding to at least one of an authorization or an authentication of the user account at the service provider; and provide, responsive to the request, the identity assurance score of the user account to the service provider for at least one of the authorization or the authentication of the user account at the service provider.

10. The system of claim 9, wherein obtaining the enrollment confidence score comprises generating the enrollment confidence score as a function of one or more of a type of credential issued by the enrollment provider, an enrollment history of the enrollment provider, or a complexity of an enrollment process of the enrollment provider.

11. The system of claim 9, wherein the validation confidence score is based on one or more of the enrollment confidence score, the credential issued by the enrollment provider, or a validation type that indicates a manner in which the credential is validated.

12. The system of claim 11, wherein the validation type comprises at least one of an in-person validation, video call validation, photo validation, or credential authentication.

13. The system of claim 9, wherein the processor is further configured to:
determine an age of the identity assurance score; and
decrease the identity assurance score as a function of the age when the age exceeds an age threshold.

14. The system of claim 9, wherein the processor is further configured to:
determine an age of the credential; and
decrease the validation confidence score as a function of the age when the age exceeds an age threshold.

15. The system of claim 9, wherein the user account is authorized when the identity assurance score satisfies a threshold.

16. The system of claim 15, wherein the identity assurance score satisfies the threshold when the identity assurance score exceeds the threshold.

17. A non-transitory computer-readable medium comprising:
computer-readable instructions that, when executed by a processor, cause the processor to perform one or more operations comprising:
obtaining an enrollment confidence score that indicates a level of confidence in an enrollment provider that issued a credential to a user that was used by the user to register a user account;
obtaining a validation confidence score that indicates a level of confidence in a validation process for validating the credential that was used by the user to register the user account;
determining an identity assurance score associated with the user account that indicates a level of confidence in an identity of the user, wherein the identity assurance score is determined based at least in part on one or more of the enrollment confidence score or the validation confidence score;
receiving, from a service provider, a request for the identity assurance score for the user account, the request corresponding to at least one of an authorization or an authentication of the user account at the service provider; and
providing, responsive to the request, the identity assurance score of the user account to the service provider for at least one of the authorization or the authentication of the user account at the service provider.

18. The non-transitory computer-readable medium of claim 17, wherein obtaining the enrollment confidence score comprises generating the enrollment confidence score as a function of one or more of a type of credential issued by the enrollment provider, an enrollment history of the enrollment provider, or a complexity of an enrollment process of the enrollment provider.

19. The non-transitory computer-readable medium of claim 17, wherein the validation confidence score is based on one or more of the enrollment confidence score, the credential issued by the enrollment provider, or a validation type that indicates a manner in which the credential is validated.

20. The non-transitory computer-readable medium of claim 19, wherein the validation type comprises at least one of an in-person validation, video call validation, photo validation, or credential authentication.

* * * * *